(No Model.) 4 Sheets—Sheet 1.
J. McWADE.
PLANETARIUM.
No. 589,552. Patented Sept. 7, 1897.
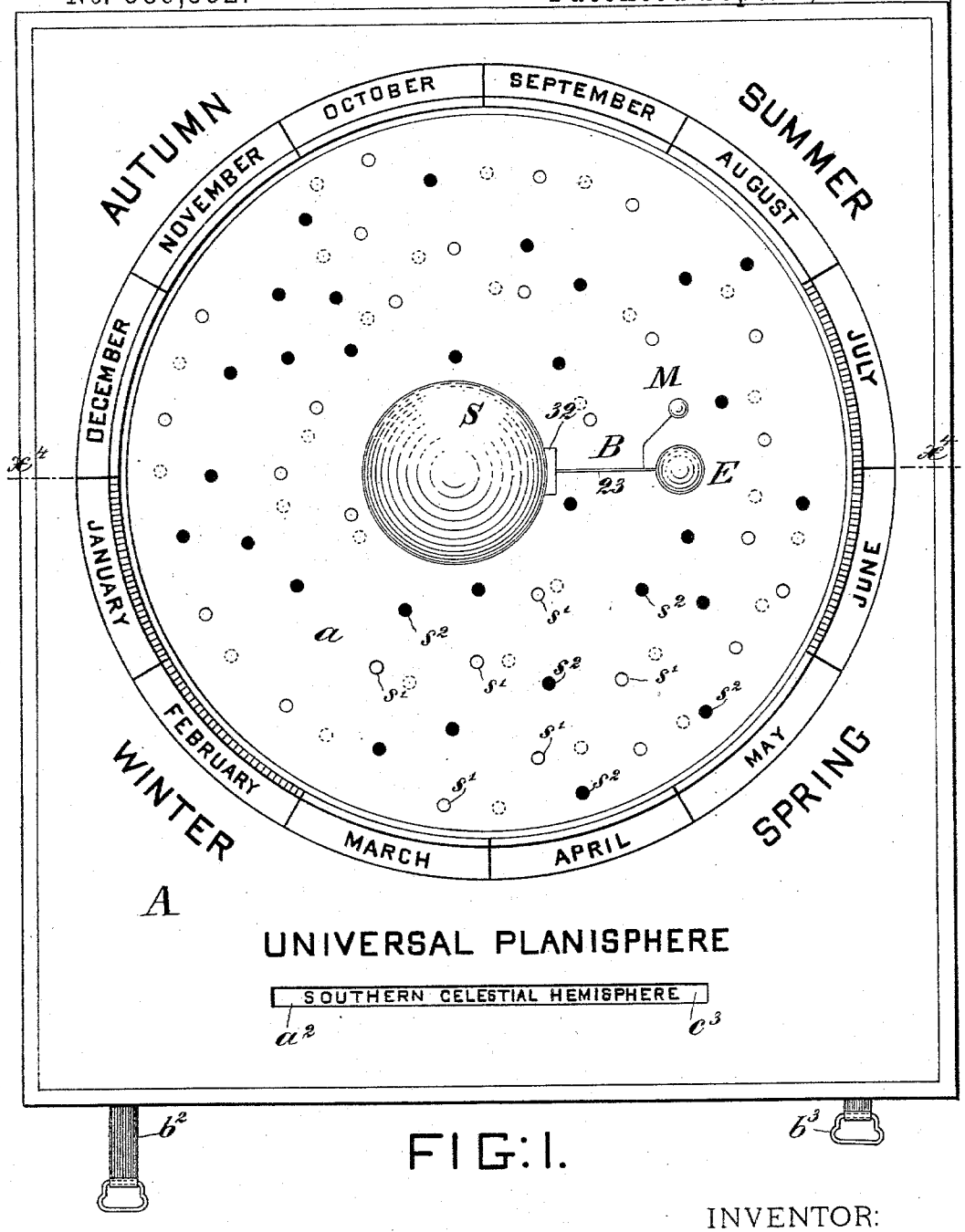
FIG:1.
WITNESSES:
F. W. Winn
Peter A. Ross
INVENTOR:
James McWade
By Henry Connett
Attorney.

(No Model.)  J. McWADE.  4 Sheets—Sheet 2.
PLANETARIUM.
No. 589,552.  Patented Sept. 7, 1897.
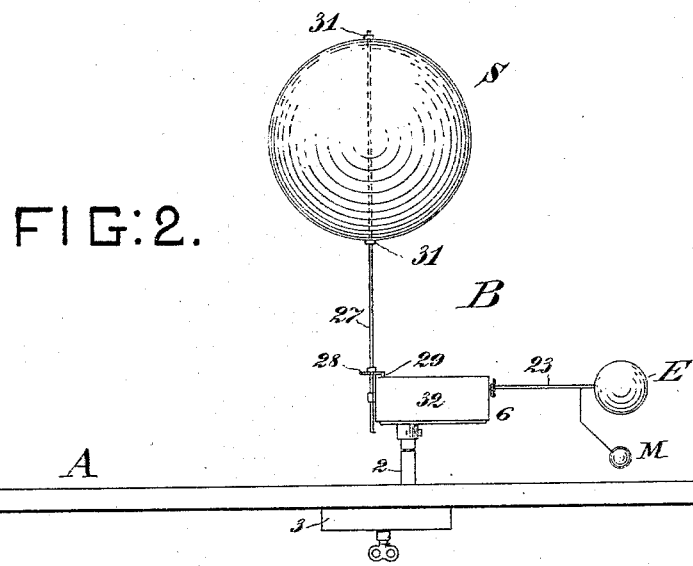
FIG:2.
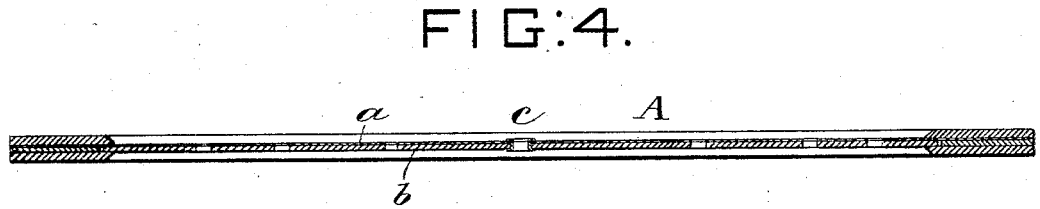
FIG:4.
WITNESSES:  
F. W. Winian  
Peter S. Ross  
INVENTOR:  
James McWade  
By Henry Connett  
Attorney.

(No Model.) 4 Sheets—Sheet 3.
J. McWADE.
PLANETARIUM.
No. 589,552. Patented Sept. 7, 1897.
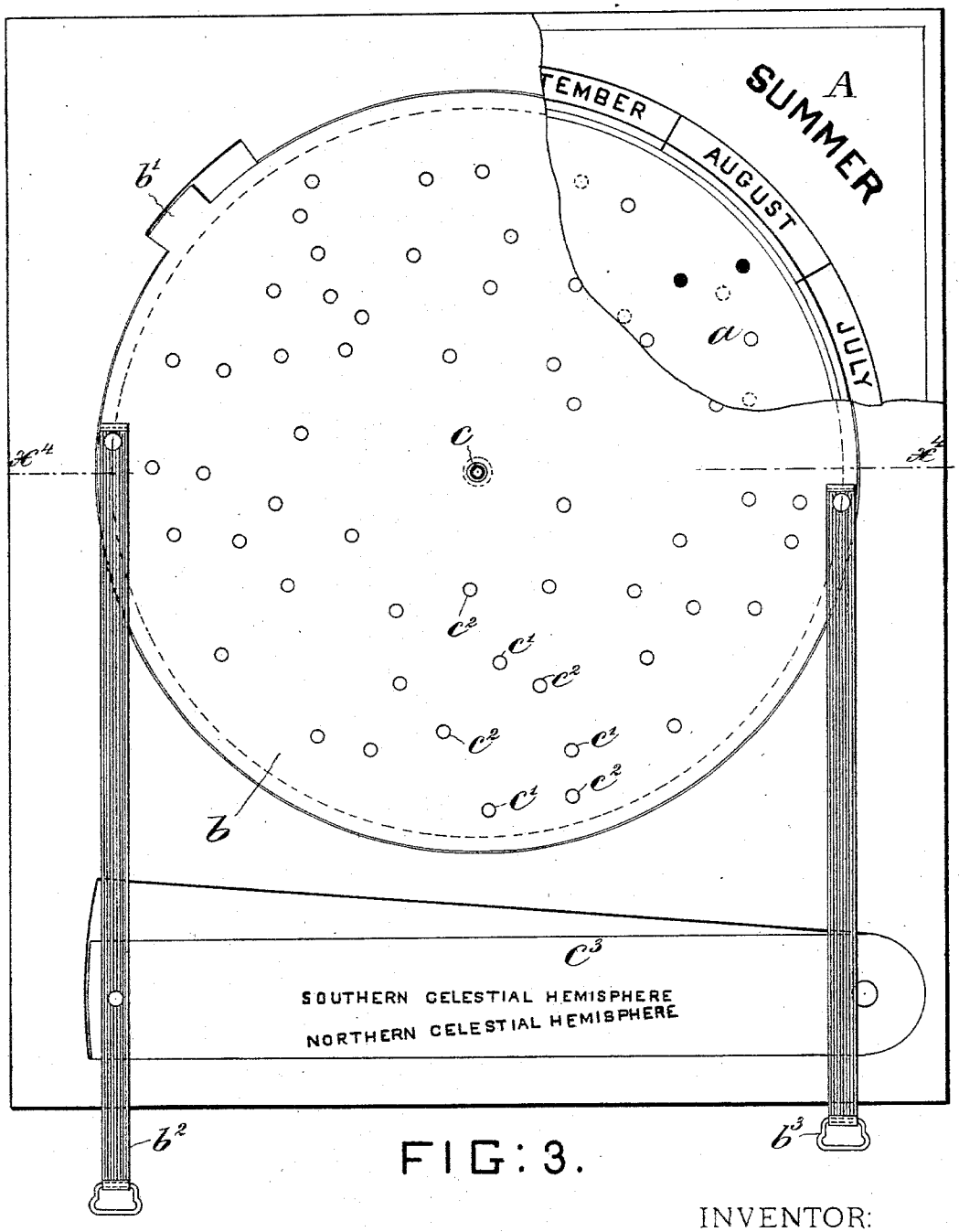
FIG: 3.
WITNESSES:
F. H. Hinman
Peter A. Ross
INVENTOR:
James McWade
By Henry Connett
Attorney.

(No Model.) 4 Sheets—Sheet 4.
J. McWADE.
PLANETARIUM.
No. 589,552. Patented Sept. 7, 1897.
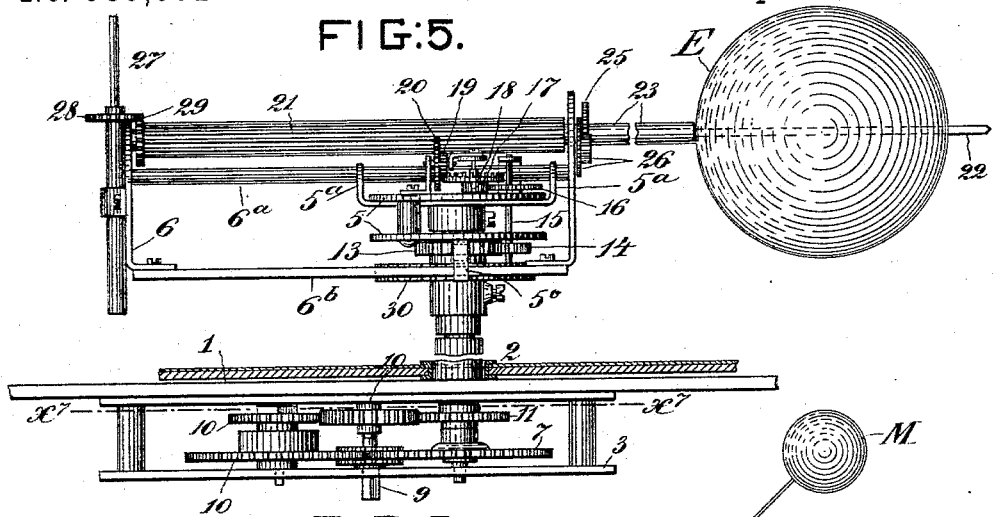
FIG: 5.
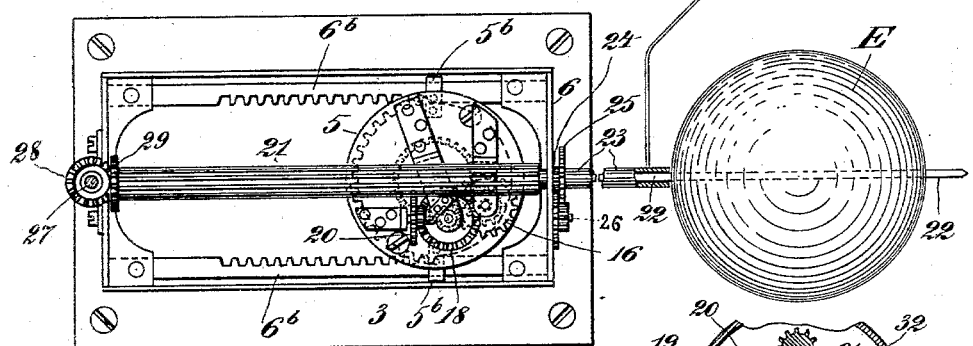
FIG: 6.
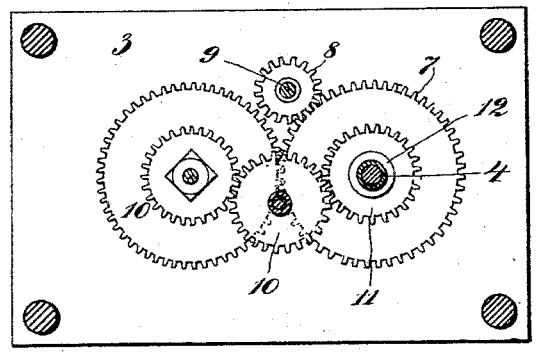
FIG: 7.
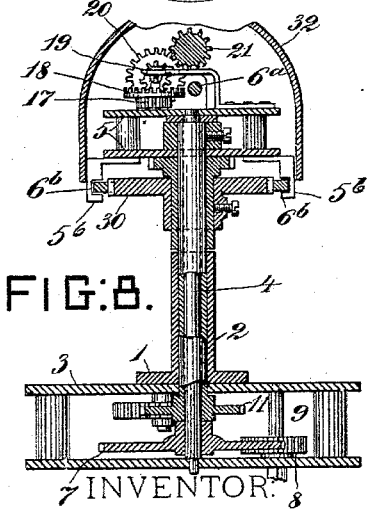
FIG: 8.
WITNESSES:
F. H. Wiman
Peter A. Ross
INVENTOR:
James McWade
By Henry Connett
Attorney.
THE NORRIS PETERS CO., PHOTO-LITHO., WASHINGTON, D. C.

United States Patent Office.

JAMES McWADE, OF NEW YORK, N. Y.

PLANETARIUM.

SPECIFICATION forming part of Letters Patent No. 589,552, dated September 7, 1897.

Application filed January 7, 1897. Serial No. 618,279. (No model.)

*To all whom it may concern:*

Be it known that I, JAMES McWADE, a citizen of the United States, residing in the city, county, and State of New York, have invented certain new and useful Improvements in Planetariums, of which the following is a specification.

This invention relates to devices for illustrating the relative positions and movements of the heavenly bodies; and the object is to provide a simple device of a mechanical character for illustrating the relative movements of the sun, earth, and moon about their axes, and the orbital movements as well, in connection with a stellar chart showing the stars of both the northern and southern hemispheres or the principal stars thereof. This chart is so arranged that by a mechanical shift the stars of either hemisphere may be made to appear significantly, at will, to correspond with the position of the earth in its orbit. This shift or transformation may be effected by rendering one set of stars transparent while the others are opaque, or the sets of stars may be made distinguishable by contrasting colors, or by one set being made to appear black and the other white, and these distinctions may be effected by transmitting light through star-apertures in the chart or by reflected light, all as will be hereinafter more particularly explained.

The invention will be more minutely described with reference to the accompanying drawings, which illustrate an embodiment of the same.

Figure 1 is a plan view of the apparatus on a comparatively small scale, about one-sixth of the preferred natural size. Fig. 2 is a side elevation thereof. Fig. 3 is a dissected view of the base of the apparatus bearing the stellar chart, illustrating the construction for producing the star transformation or shift. Fig. 4 is a transverse section of the base on line $x^4$ in Figs. 1 and 3. The remaining figures are drawn to a larger scale and illustrate the mechanism for producing the movements of the sun, earth, and moon. Fig. 5 is a side elevation of the mechanism. Fig. 6 is a plan, and Fig. 7 is a plan showing the mechanism below the line $x$ in Fig. 5. Fig. 8 is a transverse section in the plane of the axis of the spindle 4.

I will first describe the base A, which bears the stellar chart or map, premising that this chart is adapted to show, by shifting or transformation on a circular field, the stars or the principal stars of both the northern and southern hemispheres.

Referring to Figs. 1, 3, and 4, the base A comprises a square frame in which is a circular stellar chart $a$, on which are marked the principal stars of both hemispheres, here indicated merely by a few circular apertures $s'$, supposed to represent the stars of the northern hemisphere, and other apertures $s^2$, supposed to represent those of the southern hemisphere. In order that the stars of one hemisphere only may be indicated at one time, say by transmitted light, the construction illustrated in Figs. 3 and 4 is employed. Under the chart $a$, broken away in Fig. 3, is rotatively mounted a circular disk $b$, having in it two sets of apertures $c'$ and $c^2$, so placed that by rocking the disk about its center $c$ the set of apertures $c'$ may be brought into register with the apertures $s'$ in the chart $a$ or the apertures $c^2$ into register with the apertures $s^2$ in the chart. When either set of stellar apertures $s'$ or $s^2$ is brought thus into register with those of the disk $b$, the light will pass through thereat and produce bright points of light, simulating stars, while those of the other set remain opaque.

The disk $b$ may be rocked or shifted by any convenient means. As shown in Fig. 3, the disk has at one side a lug $b'$, which has a limited play in a recess formed in the distancing piece or sheet of pasteboard of the base A. Operating-tabs $b^2$ and $b^3$ are connected by cords or tapes with the respective sides of the disk. By drawing on the tab $b^2$, for example, the disk is rocked or rotated in one direction, and by drawing on the tab $b^3$ it is rotated in the opposite direction. The movement in each direction is so limited by the lugs $b'$ that at each terminus of the same one set of stellar apertures in the chart $a$ will be put in register with the corresponding set of apertures in the disk $b$.

If it be desired to transmit colored light at the stellar apertures, it is only necessary to cover the face of the disk $b$ with a piece of thin translucent material, as tissue-paper, of any desired tint or color. If light is to be transmitted as bright points to represent the stars, very small holes, as pin-holes, will suffice.

In order to designate which set of stars is displayed on the chart, the device illustrated in Figs. 1 and 3 may be employed. On a hinged strip $c^3$ are inscribed the words "Southern celestial hemisphere" and "Northern celestial hemisphere," and the free end of this strip is coupled to the tab $b^2$, so that when this tab is drawn upon the inscription "Southern celestial hemisphere" will appear at a sight-opening $a^2$ in the frame about the chart $a$. When the tab $b^3$ is pulled or drawn upon, the other inscription will appear at the sight-opening.

Around the margins of the chart $a$ are marked the graduations representing the degrees of the circle, the twelve monthly divisions, and the names of the four seasons. These are clearly shown in Fig. 1, although I have not deemed it necessary therein to extend the graduations entirely around the circle.

I will now describe the mechanism for illustrating the movements of the sun, earth, and moon, as illustrated in Figs. 1, 2, 5, 6, 7, and 8. This mechanism is designated as a whole in Figs. 1 and 2 by B. S represents the sun, E the earth, and M the moon. At the back of the base A is fixed a bar or plate 1, that has on it a tubular bearing 2, which extends up through the center of the chart $a$. The disk $b$ turns about this bearing-piece. Mounted on the plate 1 at its back is a frame 3, in which is mounted a spindle 4, which extends upward through the bearing 2 and rotates therein. On the upper end of this is fixed a head 5, on which is mounted a cradle 6. This cradle is adapted to slide endwise to and fro in bearings on the head, and to guide the cradle in its movement a longitudinal central rod $6^a$ on the cradle plays through apertured lugs $5^a$ on the head. The cradle has also two racks $6^b$ at its base, which play in guides $5^b$ on the head 5.

On the spindle 4 in the frame 3 is fixed a toothed wheel 7, which gears with a toothed wheel 8, fixed on the driving-arbor 9, this latter being squared, as here shown, to receive a key. The wheel 7 is connected, through a train of gears 10, with a toothed wheel 11, fixed on a tubular or hollow spindle 12, embracing the spindle 4 and extending up to the head 5 thereon. The effect of the train 10 is to cause the spindles 4 and 12 to rotate in opposite directions when the arbor 9 is rotated. On the upper end of the hollow spindle 12 is fixed, directly beneath the head 5, a toothed wheel 13, and with it gears a wheel 14, fixed on an upright arbor 15 in the head. This arbor 15 carries on its upper end a toothed wheel 16, which gears with a pinion 17 on the same upright arbor with a crown-wheel 18, which latter gears with a pinion 19 on the same horizontal arbor with a toothed wheel 20. The wheel 20 gears with a long pinion 21, which has bearings at its ends in the ends of the cradle 6. The arbor or spindle 22, on which the earth E is fixed, is secured in one end of the long pinion 21 and rotates therewith.

The effect of rotating the operating-arbor 9 is to rotate the head 5 and cradle 6 about the spindle 4 as an axis and to rotate the hollow spindle 12 and wheel 13 in the opposite direction. The wheel 13 drives the wheel 14, and through it and the wheels 16, 17, 18, 19, and 20 it drives the long pinion 21, thus imparting the proper axial rotation to the earth E.

The moon M is carried by a tubular spindle 23 on the spindle 22, and is driven from the latter at the proper speed through the medium of toothed wheels 24 and 25 on the respective spindles 22 and 23 and suitable connecting-gears 26 on the end of the cradle 6. Thus the orbital motion is imparted to the moon.

The sun S is mounted on an upright spindle 27, mounted in a bearing on the end of the cradle 6 opposite to that where the earth is mounted, and it has the proper axial rotation imparted to it by a wheel 28 on the spindle 27, which gears with and is driven by a toothed wheel 29 on the end of the long pinion 21.

The above-described mechanism imparts the proper axial rotation to the sun and earth, the proper orbital movement to the moon about the earth, and a circular orbital movement to the earth and moon about the sun. It now remains to explain the means employed for imparting the elliptical orbital motion to the earth.

Fixed indirectly to the tubular spindle 12, in the plane of the two racks $6^b$ on the cradle 6 and between the latter, is a mutilated-gear wheel 30, having teeth on but one-half of its periphery. These teeth gear alternately with the racks $6^b$, and consequently continuous rotation of the wheel 30 in one direction imparts a reciprocating to-and-fro motion to the cradle 6 in its guides. This motion, combined with the rotary motion of the cradle about the spindle 4 as a center, produces the proper elliptical movement of the earth in its orbit.

As shown in Fig. 8, the wheel 30 is secured by a set-screw to the sleeve-like boss of the wheel 13, which latter is fixed to the spindle 12; but this is only a feature of construction and does not relate to the invention.

The sun S may be fixed on its upright spindle, if desired. However, I prefer to mount it frictionally thereon, so that it can be moved or adjusted up or down on the spindle 27, as desired, in order to illustrate better the varying angles of the earth's axis with the plane passing through the earth and sun. As shown in Fig. 2, friction-nuts 31, of some soft material, are placed on the spindle 27, above and below the sun S, to hold it in place; but any suitable frictional device may be employed as well.

In Figs. 1 and 2 the cradle 6 is represented as covered by an inclosing cap 32 to hide the mechanism and prevent it from distracting the attention of the pupil. This, however, is not essential, nor is it necessary to inclose the mechanism in the frame 3, as indicated in Fig. 2.

The bar or plate 1 is only a convenient means of connecting the gearing of the planetarium to the base A, and it may be of any form or construction and of any material.

I have called the spheres S, E, and M the "sun," "earth," and "moon," respectively, for convenience of description. They merely simulate these bodies, of course, as in any planetarium. They may be of any suitable material and may have geographical markings, if desired; but this is not essential to my invention.

Having thus described my invention, I claim—

1. A base for a planetarium comprising a stationary stellar chart having stars of both hemispheres marked on it by apertures, a rotating disk behind said chart and adapted for partial rotation, means for limiting such rotation, and means for effecting such rotation, said disk having also the stars of the different hemispheres marked thereon and adapted to be brought into register with the star-apertures in the chart, substantially as set forth.

2. In the base A of the planetarium, the combination with the fixed stellar chart $a$, having in it two sets of apertures $s'$ and $s^2$, representing respectively the stars of the two hemispheres, of the rotatable disk $b$, back of said chart, said disk having in it two sets of apertures $c'$ and $c^2$, adapted to be brought, respectively, into register with the sets of apertures $s'$ and $s^2$ by the rotatory movement of the disk, means for limiting the extent of rotation of said disk, and means for rotating said disk, substantially as set forth.

3. In the base A of the planetarium, the combination with the fixed stellar chart $a$, having in it two sets of apertures $s'$ and $s^2$, representing respectively the stars of the two hemispheres, of the rotatable disk $b$, back of said chart, said disks having in it two sets of apertures $c'$ and $c^2$, adapted to be brought, respectively, into register with the sets of apertures $s'$ and $s^2$ by the rotatory movement of the disk, means for limiting the extent of rotation of said disk, tabs $b^2$ and $b^3$, connected to opposite sides of said disk for operating the same, and a hinged strip $c^3$, bearing inscriptions, arranged behind a sight-opening in the face of the base A, and connected with one of the said tabs, whereby said hinged strip is operated when the disk $b$ is shifted, substantially as set forth.

4. In a planetarium, the combination with an upright spindle 4, carrying a head 5, the said head, and a cradle 6 mounted for reciprocating movement on said head transversely to the axis of the spindle 4, of the tubular spindle 12, a train of gears connecting the spindles 4 and 12, whereby they are rotated simultaneously in opposite directions, the long pinion 21, in the cradle, a gearing-train between the spindle 12 and said pinion, whereby the pinion is rotated therefrom as the head turns, racks $6^b$ on the cradle, a mutilated-gear wheel 30 on the shaft 12 adapted to engage said racks alternately and thus impart a reciprocating movement to the cradle, a sphere E, carried by the pinion 21, and representing the earth, the tubular spindle 23, on the spindle carrying the earth, gearing between the pinion 21 and spindle 23 whereby the former drives the latter, a sphere M, carried by the spindle 23 and representing the moon, an upright spindle 27, on the cradle, gearing between the pinion 21 and said spindle, whereby the former drives the latter, and a sphere S on said spindle 27, representing the sun, substantially as set forth.

5. In a planetarium, the combination with the cradle 6, and mechanism for imparting thereto a rotary movement and a reciprocating movement at right angles to the plane of said rotary movement, of the spheres representing the earth and moon carried by said cradle, mechanism for imparting the proper rotatory and orbital movements to said spheres, the upright spindle 27, mechanism for rotating the same, and the sphere S, representing the sun, mounted adjustably in said spindle 27, so that it may be shifted up or down thereon at will, substantially as set forth.

In witness whereof I have hereunto signed my name in the presence of two subscribing witnesses.

JAMES McWADE.

Witnesses:
HENRY CONNETT,
PETER A. ROSS.